United States Patent [19]

Manelphe

[11] Patent Number: 5,077,609
[45] Date of Patent: Dec. 31, 1991

[54] OPTOELECTRONIC SYSTEM OF ASSISTANCE IN ATTACK AND NAVIGATION MISSIONS

[75] Inventor: Christophe Manelphe, Chattillon, France

[73] Assignee: Thomson-CSF, Puteaux, France

[21] Appl. No.: 593,746

[22] Filed: Oct. 5, 1990

[30] Foreign Application Priority Data

Dec. 1, 1989 [FR] France .................. 89 15890

[51] Int. Cl.[5] .......................................... H04N 7/18
[52] U.S. Cl. .................................. 358/109; 358/103; 358/110; 358/113
[58] Field of Search ............... 358/113, 110, 109, 180, 358/93, 125, 126, 103

[56] References Cited

U.S. PATENT DOCUMENTS

| | | | |
|---|---|---|---|
| 4,199,785 | 4/1980 | McCullough et al. | 358/113 X |
| 4,298,280 | 11/1981 | Harney | 358/113 X |
| 4,333,106 | 6/1986 | Löwe | 358/107 |
| 4,608,599 | 8/1986 | Kancko et al. | 358/113 |
| 4,910,593 | 3/1990 | Weil | 358/113 |

FOREIGN PATENT DOCUMENTS 0342419 11/1989 European Pat. Off. .
3146552 7/1983 Fed. Rep. of Germany .

*Primary Examiner*—Victor R. Kostak
*Attorney, Agent, or Firm*—Oblon, Spivak, McClelland, Maier & Neustadt

[57] ABSTRACT

A wide-field infrared camera, with a fixed focal distance, generates a wide-field image which is displayed by a first monitor adapted to display and superimpose the wide-field image on a scene viewed in a head-up visor for example. An image processor generates a signal representing a small-field image, which is a portion of the wide-field image, with an adjustable enlargement and an adjustable position within the wide-field image, and computes the elevation of the bearing of a point of interest at the center of the small-field image. A second monitor is provided to display the small-field image as is a laser telemeter and an aiming device to servo-control the line of sight of the telemeter in such a way that it always corresponds to the center of the small-field image. The arrangement can be applied to the three-dimensional localization of a point of interest, for a navigational resetting operation or for a firing control operation.

4 Claims, 2 Drawing Sheets

OPTOELECTRONIC SYSTEM OF ASSISTANCE IN ATTACK AND NAVIGATION MISSIONS

BACKGROUND OF THE INVENTION

1. Field of the Invention

The invention concerns an optoelectronic system of assistance in aerial attack and navigation missions This system is designed to be carried by an aircraft, a helicopter or a remote-controlled missile.

To fulfil his mission, the pilot of an aircraft needs the following (by day or night or under poor weather conditions):

knowledge of the forward landscape (for the piloting function);

the precise spatial localization of observable elements of the landscape as initial points for firing control or as targets (for the attack/reconnaissance function).

It is thus possible to distinguish several types of carriers according t their ability to fulfil each of these tasks by means of the optoelectronic systems that they contain.

2. Description of the Related Art

In most carriers in prior technology, the optoelectronic equipment is rudimentary or even non-existent. Certain carriers have a wide-field infrared imager that is assigned chiefly to the piloting function, but can provide only limited assistance for the navigation and attack functions (as it does not give precise knowledge of the aircraft-target distance). Others have only one telemeter that enables them to appreciate this distance but cannot be used to do fine aiming by night or under poor weather conditions.

A limited number of carriers assigned to sophisticated missions have, for their part, complex systems generally contained in two pods by way of payload:

an element called a "navigation" element including at least one wide-field imager specially adapted to the piloting function;

an element called an "attack" element comprising a small-field imager coupled to a laser telemeter in an aiming direction that is variable in all directions of space, specifically oriented towards missions of attack by guided weapons.

The assemblies, by their association, make it possible to have all the data needed for the mission, but their cost and bulk justify their use only for very specific missions entailing the use of laser guided weaponry or missiles with imaging.

SUMMARY OF THE INVENTION

The invention described herein concerns all carriers. By day as well as by night, or under poor weather conditions, it is designed to significantly improve the precision of their navigation or the precision of any other part of their mission that may be related thereto (reconnaissance, firing of autonomously guided munitions) and to increase the firing precision of unguided weapons (guns, rockets, conventional bombs) if these are used.

The object of the invention is a system comprising essentially a wide-field infrared camera with fixed focal distance, and an image processor playing the role of a zoom lens to obtain a small-field image, extracted from the wide-field image, with adjustable enlargement and a position that can be adjusted within the wide-field image. This system is simpler than the standard systems used for the laser designation of targets, since it has no zoom lens or aiming device. It may be integrated into the interior of the body of an aircraft and therefore does not occupy any hooking point beneath the aircraft. It enables precise measuring of the elevation and bearing of a point of interest for navigation or firing.

According to the invention, there is proposed an optoelectronic system of assistance in aerial attack and navigation missions comprising:

a wide-field infrared camera with fixed focal distance;

first display means to display a wide-field image; wherein said system comprises:

image processing means comprising means to provide a signal representing a small-field image, which is a portion of the wide-field image, with an adjustable enlargement and an adjustable position within the wide-field image;

means for the manual adjustment of the enlargement and the position;

second display means to display the small-field image.

According to another characteristic, the system according to the invention includes a laser telemeter, associated with an aiming device having a small range of movement corresponding to the solid angle of the field of the camera, the line of sight of this laser telemeter being servo-controlled to be aimed at a point of interest that is seen at the center of the small-field image. The system then makes it possible to measure the distance from this point of interest, in addition to the elevation and bearing, by day or by night.

BRIEF DESCRIPTION OF THE DRAWINGS

The invention will be understood more clearly and other details shall appear from the following description and from the figures that accompany it.

DESCRIPTION OF THE PREFERRED EMBODIMENT

Figure 1:
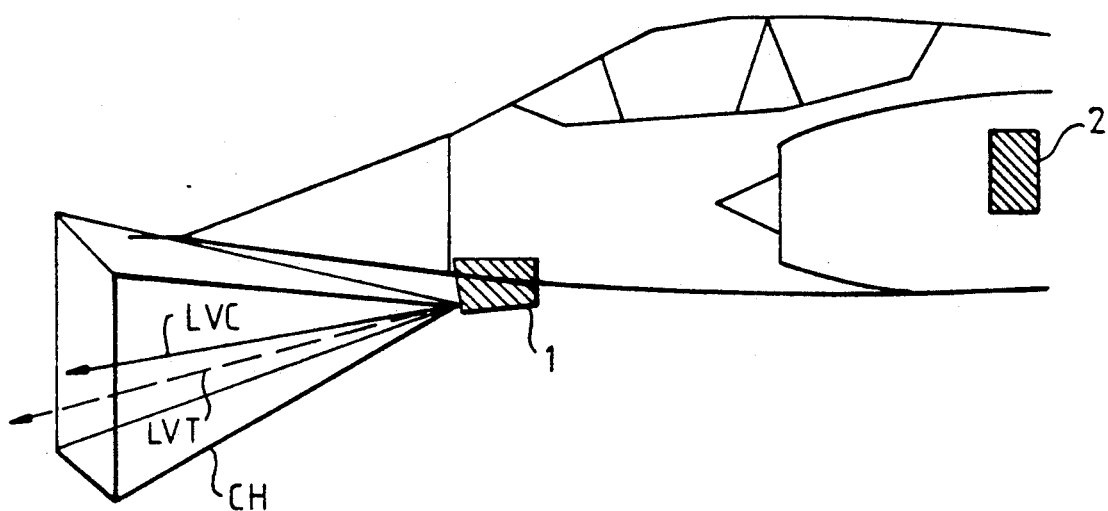
FIG. 1 gives a schematic view of an exemplary embodiment of the system according to the invention, integrated into the body of an aircraft.

FIG. 1 shows an exemplary embodiment comprising essentially: an optoelectronic box 1 located beneath the nose of the aircraft, with one or two windows emerging from beneath the aircraft; and an electronic box 2 housed in the body, in the rear of the cockpit. The box 1 contains an infrared camera having a wide field, marked CH, and having a line of sight, marked LVC, directed fixedly towards the front of the aircraft with an inclination of some degrees. The field of this camera is of the order of 30 degrees diagonally. The box 1 further has a laser telemeter for which the line of sight, referenced LVT, can be oriented throughout the field CH of the camera, but cannot be oriented downwards with respect to the aircraft or towards the rear of the aircraft.

Figure 2:
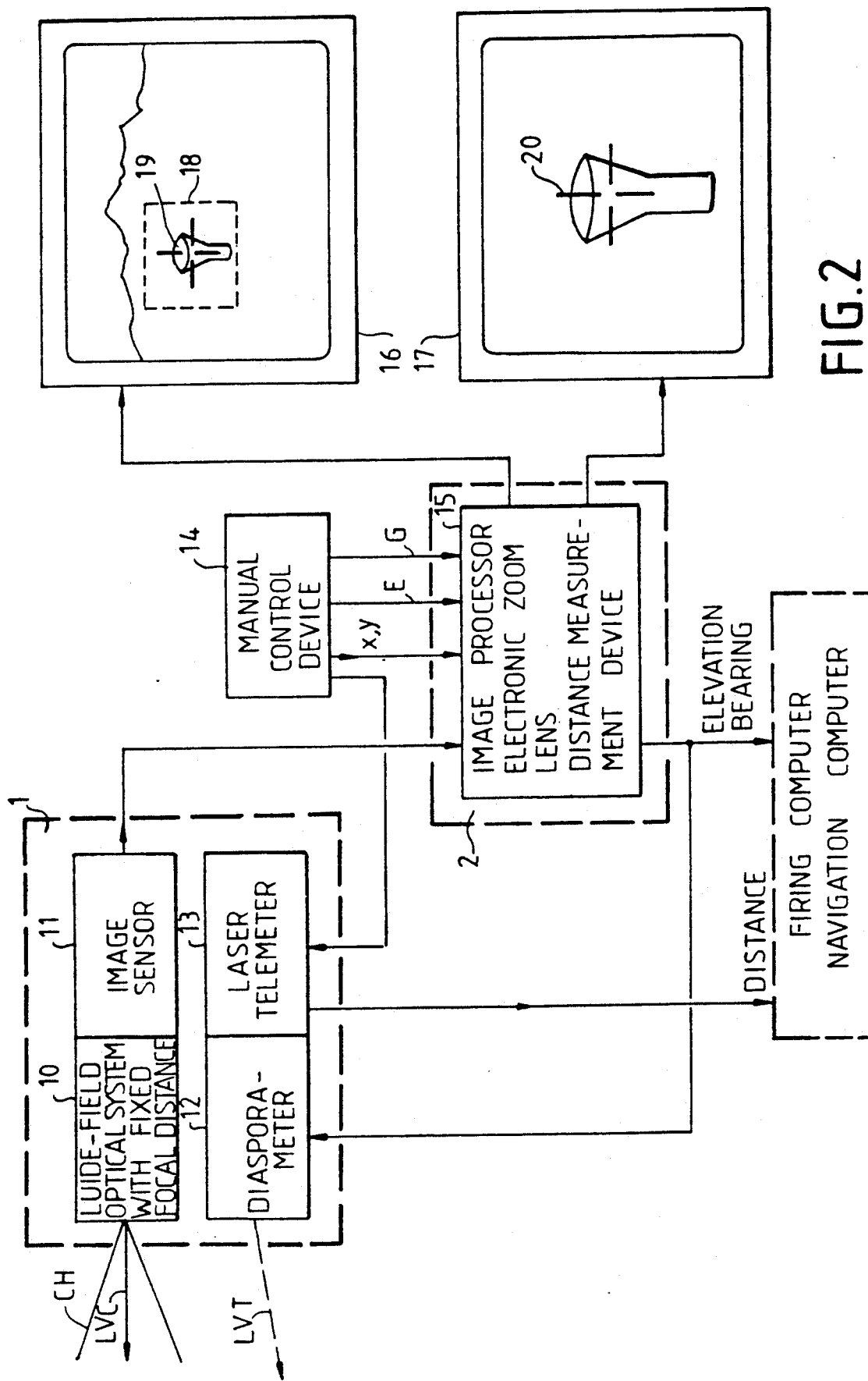
FIG. 2 shows the block diagram of this exemplary embodiment.

FIG. 2 shows the block diagram of this exemplary embodiment of the system according to the invention. The box 1 includes an infra-red camera constituted by a wide-field optical system 10 with fixed focal distance, and a high-resolution image sensor 11 constituted, for example, by a charge-transfer matrix sensor having 512×512 cells. The camera could also be constituted by a linear array of photosensitive cells and an optomechanical scanning device.

The box 1 also has a laser telemeter 13 associated with two "diasporameters" 12 that enable the line of sight LVT to be deflected. The diasporameters 12 are standard devices comprising two rotating prisms. They enable aiming with low deflection, but using far simpler and far less bulky means than those used in the aiming devices with high deflection included in standard systems for target designation by laser.

The optical channel of the infrared camera and the optical channel of the laser telemeter can be parallel to each other, with two separate windows, or else they may be mixed by standard optical means, in order to use a single window. Since the camera has a wide field, the window may have a small dimension, for a given sensitivity. Consequently, the window goes slightly beyond the body and causes little aerodynamic disturbance.

The electronic box 2 has essentially an image processor 15. The system further includes a manual control device 14, and two television monitors 16 and 17. The monitor 16 displays a wide-field image that corresponds to an image analyzed by the image sensor 11 of the camera. On this image, there is superimposed a movable reticle 19, the position of which can be adjusted by means of the manual control device 14. The monitor 17 displays a small-field image that corresponds to a portion 18 of the wide-field image, this portion 18 being centered on the reticle 19. At the center of the small field image, displayed on the monitor 17, a fixed reticle 20 indicates the center of the small-field image and indicates the direction of the line of sight LVT of the laser telemeter.

The wide-field image represents the entire front sector being flown across, with a fixed line of sight that is perfectly aligned with the aircraft. This permits the projection of this image, at the scale of 1 superimposed on the scene, by means of a multiple-mode head-up electronic visor. The small-field image can be presented on a head-straight monitor (i.e. with the head in the mid-position) or head-down monitor.

The manual control device 14 has an output connected to an input of the image processor 15, to give it coordinates (x, y) defining the position of the movable reticle 19 within the wide-field image.

An output of the image sensor 11 is connected to an input of the processor 15. Two outputs of the processor 15 are connected respectively to inputs of the monitors 16 and 17, and give them two video signals representing respectively the wide-field image and the small-field image, with the reticles 19 and 20. An image processing operation, performed by the processor 15, extracts a portion of the wide-field image, centered on the coordinates (x, y) and computes the luminance values of the small-field image. A standard method of performing this computation is, for example, by cubic interpolation.

An output of the device 14 gives a value G to the processor 15, to define the enlargement of the small-field image. This enlargement may be variable, for example between 1 and 4, for a matrix sensor with 512×512 cells. The processor 15 therefore fulfils the role of an electronic zoom lens. It enables a point of interest to be aimed at with precision, thus enabling the system to measure the bearing and the elevation of this point of interest t be measured with greater precision than with the wide-field image alone. It advantageously replaces an optical zoom lens since it enables the use of an optical system 10 that is simpler and less bulky than an optical zoom lens, or a second optical channel including a second camera provided with a small-field objective with fixed focal distance. The resolution obtained with this electronic zoom lens is sufficient to improve the navigating precision and the firing precision of unguided munitions, these munitions being fired at distances that are appreciably smaller than the firing distance of guided munitions.

Another output of the processor 15 gives an elevation value and a bearing value to the firing computer and to the navigation computer that are included in the aircraft, these values being deduced from the coordinates (x, y).

An output of the device 14 is connected to a control input of the processor 15, and gives it a logic signal E when the user wishes to start an image processing operation performing a distance measurement and a operation for tracking a point of interest in the sequence of wide-field images, to stabilize the wide-field image and the small-field image on a point of interest, after said user has adjusted the reticles 19 and 20. The movable reticle 19 is adjusted no longer manually but by the processor 15 which periodically determines new coordinates (x, y) for the reticle 19 and deduces new elevation and bearing values therefrom. Thus, the movable reticle 19 automatically tracks the point of interest, and this point of interest is kept at the center of the fixed reticle 20 in the small-field image.

The line of sight LVT of the laser telemeter 13 is servo-controlled in such a way that it is aimed at the point of interest seen at the center of the small-field image. The output of the processor 15, which gives the elevation and the bearing, is connected to an input of the diasporameters 12. A standard servo-control device, not shown, actuates the diasporameters to point the light of sight LVT in the direction having this elevation and this bearing. Thus, the telemeter 13 is automatically aimed at the point of interest that the user sees at the centers of the reticles 19 and 20. The processing operation for the distance measurement and tracking periodically determines a new elevation and bearing value, thus enabling the line of sight LVT and, at the same time, the reticles 15 and 20, to be stabilized on the point of interest.

An output of the device 14 is connected to an input of the telemeter 13, to enable the user to trigger the firing of the laser measuring the distance between the telemeter and the point of interest. An output of the telemeter 13 gives the measured value to the firing computer and to the navigation computer of the aircraft.

This system enables the acquisition and three-dimensional localization of a point of interest by day or by night, or under conditions of poor visibility, provided that this point is located in the field of the camera. This point may be a resetting point for navigation or a firing control input point. The input point is either the target in the case of firing at sight, or the initial firing point in the case of blind firing or firing at a safe distance. The firing precision is improved, as compared with a two-dimensional localization, for the distance measurement makes it possible to determine the altitude of the target with respect to a reference level. The firing control computer may therefore take this altitude into account.

At he nears each main stage of his mission, either for a navigation resetting operation or for an activation of the firing control, the user sets the position of the reticle 19 and the reticle 20 on the point of interest. This setting may be done by sight, when the right moment arises, either by using information given by the aircraft navigation system, previously instructed during the preparation of the mission, or else by using information provided by a target extraction processing operation, performed by the image processor 15.

When the user sees the point of interest at the center of the reticle 20 of the small-field image, he starts the processing operation for the distance measurement and resetting in order to stabilize the line of sight of the telemeter and the center of the small-field image, on the point of interest, in order to compensate for the apparent shifts in the image which are due to the movements of the aircraft, notably its approaching the point of interest.

The user then orders the acquisition of the three-dimensional coordinates of the point of interest by triggering the laser telemeter. The laser telemeter therefore gives the distance while the processor 15 gives the elevation and the bearing of the point of interest. This operation of three-dimensional localization may be done:

either in real time, on a one-by-one basis, at the instant when the user orders it, or in real time, continuously, by an automatic repetition if the target remains in the field of the camera, which is generally the case during a firing stage, or in deferred mode, the three-dimensional coordinates being determined a posteriori, using elevation, bearing and distance values that have been memorized to free the user as soon as he has set the reticles on a point of interest.

The system may also be applied to very low altitude navigation, the wide-field image being used to reinforce the choice of options, and it being possible to use the laser telemeter for continuous measurement of the distance between the aircraft and the obstacles, by a continual scanning in a vertical plane, with the maximum range of movement.

The processor 15 is a standard type of image processor. Its programming, to perform the above-mentioned image processing operations, is within the scope of those skilled in the art. The extraction of images to extract and interpolate the small-field image, compute the elevation and bearing from the coordinates of the center of the small-field image within the wide-field image, and perform the distance measurement and tracking of a point of interest, are standard processing operations.

What is claimed is:

1. An optoelectronic system of assistance in aerial attack and navigation missions comprising:
   a wide-field infrared camera, with a fixed focal distance, for generating a wide-field image; and
   first display means to display the wide-field image generated by the wide-field infrared camera;
   wherein said system further comprises:
   image processing means comprising means to provide a signal representing a small-field image, which is a portion of the wide-field image, with an adjustable enlargement and an adjustable position within the wide-field image;
   adjusting means for the manual adjustment of the enlargement of the small-field image and the position of the small-field image; and
   second display means to display the small-field image.

2. A system according to claim 1, wherein the image processing means includes means to determine an elevation and bearing of a point of interest that is visible at a center of the small-field image, as a function of the adjustable position adjusted by the adjusting means.

3. A system according to claim 2 wherein, to determine the distance between the system and a point of interest, said system further includes:
   a laser telemeter; and
   an aiming device having a range of movement covering an entire field of the camera, a line of sight of this laser telemeter being servo-controlled as a function of the elevation and the bearing determined by the image processing means.

4. A system according to claim 3 wherein, to stabilize the display of the point of interest and the line of sight of the telemeter on this point of interest, the image processing means further includes means to track the point of interest in the wide-field image.

* * * * *